(12) United States Patent
Appleyard (10) Patent No.: US 10,093,342 B2
(45) Date of Patent: Oct. 9, 2018

(54) STEERING COLUMN ASSEMBLY

(71) Applicant: TRW Limited, Solihull, West Midlands (GB)

(72) Inventor: Michael Appleyard, Cheltenham (GB)

(73) Assignee: TRW LIMITED, Solihull, West Midlands (GB)

(\*) Notice: Subject to any disclaimer, the term of this patent is extended or adjusted under 35 U.S.C. 154(b) by 0 days.

(21) Appl. No.: 15/886,888

(22) Filed: Feb. 2, 2018

(65) Prior Publication Data

US 2018/0178825 A1     Jun. 28, 2018

Related U.S. Application Data

(62) Division of application No. 15/233,272, filed on Aug. 10, 2016, now Pat. No. 9,896,120.

(30) Foreign Application Priority Data

Aug. 10, 2015 (GB) .................................. 1514096.5

(51) Int. Cl.
    *B62D 1/184*     (2006.01)
    *B62D 1/19*     (2006.01)

(52) U.S. Cl.
    CPC ............. *B62D 1/192* (2013.01); *B62D 1/184* (2013.01); *B62D 1/195* (2013.01)

(58) Field of Classification Search
    CPC ......... B62D 1/184; B62D 1/192; B62D 1/195
    See application file for complete search history.

(56) References Cited

U.S. PATENT DOCUMENTS

| | | |
|---|---|---|
| 4,989,898 A | 2/1991 | Yamaguchi et al. |
| 5,634,662 A | 6/1997 | Asayama |
| | (Continued) | |

FOREIGN PATENT DOCUMENTS

| | | |
|---|---|---|
| DE | 102008007094 A1 | 9/2009 |
| DE | 102012100626 B3 | 2/2013 |
| | (Continued) | |

OTHER PUBLICATIONS

Patents Act 1977: Search Report under Section 17, Application No. GB1514096.5 dated Feb. 4, 2016.

*Primary Examiner* — Drew J Brown
(74) *Attorney, Agent, or Firm* — MacMillan, Sobanski & Todd, LLC (57) ABSTRACT

A collapsible steering column assembly comprising a steering shaft that is supported within a steering column shroud, the shroud comprising an upper shroud portion and a lower shroud portion, in which the upper shroud portion is located towards the end of the steering shaft that is nearest the steering wheel and the lower portion is located towards the end of the shaft furthest from the steering wheel, the upper portion being at least partially received within the lower portion so that the upper portion can telescopically collapse into the lower portion during a crash, a support bracket that in use is secured to a fixed part of the vehicle and includes two support bracket arms that depend from a base portion to embrace the shroud, a clamp rail that is releasably secured to the upper shroud portion, the clamp rail including a slot that extends generally horizontally, and a clamp pin that extends through an opening in each of the arms of the bracket and through the generally horizontal slot in the rail, the clamp pin carrying a clamp mechanism that is movable between an unclamped position in which the rail can move freely relative to the clamp pin and a clamped position in which the rail is fixed relative to the clamp pin. The rail is (Continued)

secured to the upper shroud portion by a deformable tab which protrudes from the upper shroud portion to hook onto a part of the rail that faces the steering wheel end of the shroud. In use of the assembly with the cam mechanism in the clamped condition the tab is deformable under a predefined load applied to the upper shroud so as to unhook from the rail allowing the upper shroud to move axially relative to the rail and hence relative to the clam pin to permit collapse of the steering column shroud.

5 Claims, 7 Drawing Sheets

(56) References Cited

U.S. PATENT DOCUMENTS

| | | |
|---|---|---|
| 9,233,707 B2 | 1/2016 | Doming et al. |
| 9,421,995 B2 | 8/2016 | Johta et al. |
| 2002/0171235 A1* | 11/2002 | Riefe ............... B62D 1/184 280/775 |
| 2003/0102658 A1* | 6/2003 | McCarthy ......... B62D 1/195 280/777 |
| 2005/0029795 A1* | 2/2005 | Camp ............... B62D 1/184 280/777 |
| 2005/0067825 A1* | 3/2005 | Manwaring ....... B60Q 1/1469 280/777 |
| 2005/0263996 A1* | 12/2005 | Manwaring ........ B62D 1/195 280/775 |
| 2006/0021460 A1* | 2/2006 | Schulz ............... B62D 1/184 74/493 |
| 2006/0033321 A1* | 2/2006 | Manwaring ....... B62D 1/195 280/777 |
| 2006/0214411 A1* | 9/2006 | Ikegaya ............... B62D 1/19 280/777 |
| 2008/0272583 A1 | 11/2008 | Lopez et al. |
| 2010/0031768 A1 | 2/2010 | Oshita et al. |
| 2010/0282016 A1 | 11/2010 | Oehri et al. |
| 2013/0118292 A1 | 5/2013 | Sulser et al. |
| 2014/0150594 A1* | 6/2014 | Riefe ................. B62D 1/195 74/492 |
| 2014/0150595 A1* | 6/2014 | Riefe ................. B62D 1/195 74/492 |
| 2014/0260762 A1* | 9/2014 | Streng .............. B62D 1/195 74/493 |
| 2015/0375770 A1* | 12/2015 | Buzzard ............ B62D 1/184 74/493 |
| 2016/0121920 A1 | 5/2016 | Klepp et al. |
| 2018/0057038 A1* | 3/2018 | Kingston-Jones ...... F16F 7/123 |
| 2018/0208233 A1* | 7/2018 | Kwon ................ B62D 1/192 |

FOREIGN PATENT DOCUMENTS

| | | |
|---|---|---|
| DE | 102013104958 B3 | 7/2014 |
| GB | 2344078 A | 5/2000 |
| JP | H06247319 A | 9/1994 |

* cited by examiner

RELEASABLE EA STRAP - Release Method

STEERING COLUMN ASSEMBLY

CROSS-REFERENCE TO RELATED APPLICATIONS

This application is a divisional of U.S. Ser. No. 15/233,272, filed 10 Aug. 2016, now U.S. Pat. No. 9,896,120, issued 20 Feb. 2018, the disclosures of which are incorporated herein by reference in entirety, which claimed priority to Great Britain Patent Application No. GB 1514096.5 filed 10 Aug. 2015, the disclosures of which are incorporated herein by reference in entirety.

BACKGROUND OF THE INVENTION

This invention relates to improvements in steering column assemblies.

Figure 1:
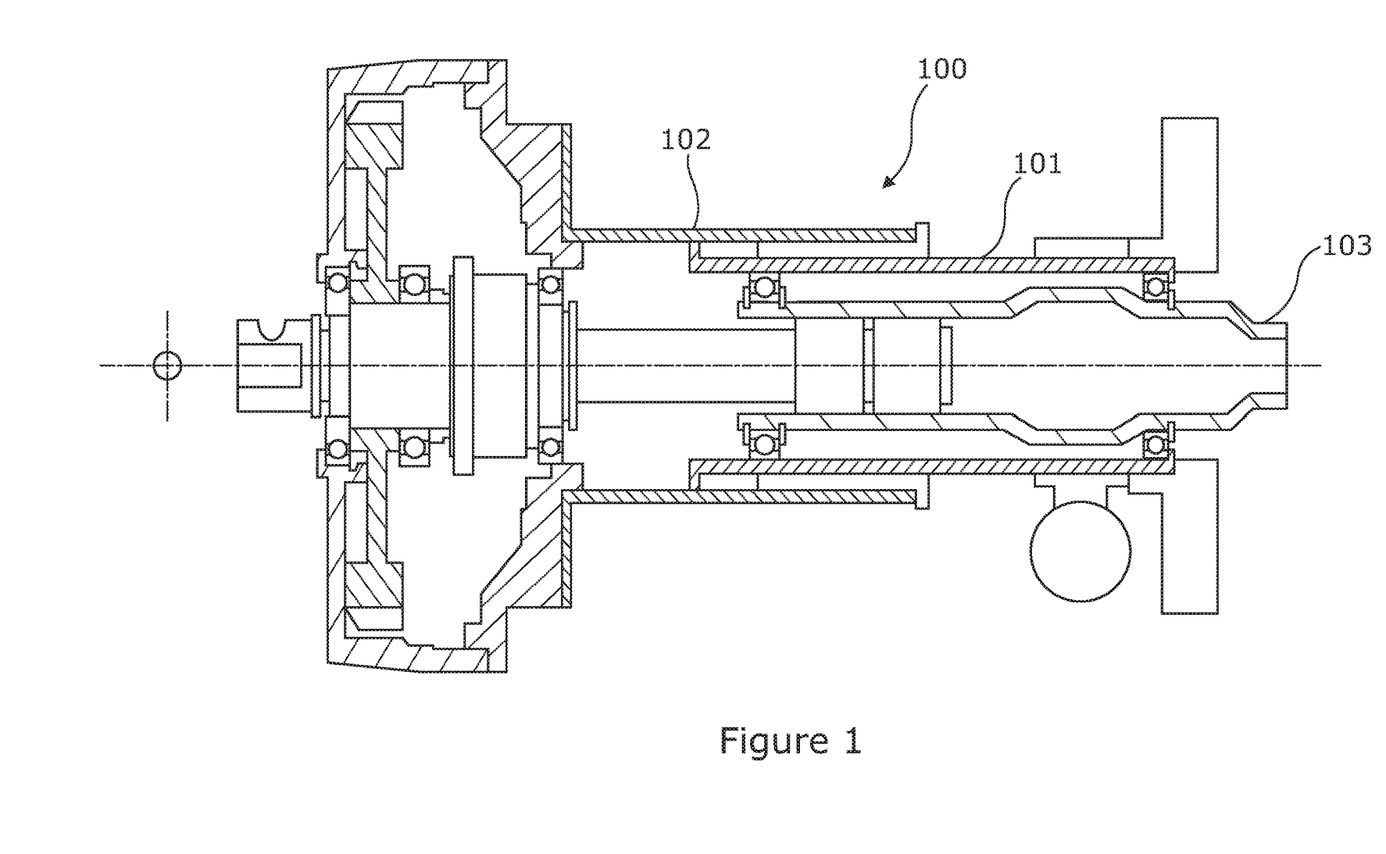
FIG. 1 is view in cross section of a steering column assembly.

It is known to provide a collapsible steering column assembly 100 comprising a steering shaft 103 that is supported within a steering column shroud. The shroud is telescopic and comprises two portions: an upper shroud portion 101 and a lower shroud portion 102, in which the upper shroud portion is located towards the end of the steering shaft that is nearest the steering wheel (not shown and the lower portion is located towards the end of the shaft furthest from the steering wheel. An end part of one of the upper portion 101 and the lower portion 102 is slidably received within an end portion of the other so that the shroud can telescopically collapse in a crash. This telescopic action may also be used to enable the overall length of the assembly to be adjusted so that the driver can set the reach of the steering wheel at a desired position. An example of such an assembly is shown in FIG. 1.

It is known for the upper shroud to slide over the lower shroud part, or to slide within the lower part. The second option is preferred as this allows the steering shaft to be supported by bearings towards each end of the upper shroud.

BRIEF SUMMARY OF THE INVENTION

A feature of the present invention is to improve on the prior art steering column assemblies to at least ameliorate one or more of the problems associated with designs in which the upper shroud portion slides inside the lower shroud portion. By providing a column in which the upper shroud is located within the lower shroud, the steering wheel shaft can be supported directly within the upper tube by bearings at each end of the tube as shown in FIG. 1, resulting in a good stiffness. However, in this column type, it is more difficult to incorporate a crash energy system which provides the same force-vs-stroke profile regardless of the initial reach-adjustment position selected prior to a crash. It is also more difficult to include a crash energy system that includes increasingly requested features such as:—
  (i) Tunable EAS (Energy Absorption Straps),
  (ii) Adaptive Energy Absorption levels to cater for belted versus unbelted drivers and/or drivers of widely different body mass and vehicle impact speeds,
  (iii) Overall Energy Absorption levels which are accurately reproducible (e.g., to +/−5%). The applicant has appreciated, for example, that if a significant proportion of the collapse resistance is due to friction effects, then the overall energy absorption will be less predictable. A major friction source would be any squeezing force that arises between the inner and outer tubes when the column is clamped in its reach/rake position which is otherwise advantageous to remove free play between the shroud portions.

1. Deformable Tab

According to a first aspect the invention provides a collapsible steering column assembly comprising a steering shaft that is supported within a steering column shroud, the shroud comprising an upper shroud portion and a lower shroud portion, in which the upper shroud portion is located towards the end of the steering shaft that is nearest the steering wheel and the lower portion is located towards the end of the shaft furthest from the steering wheel, the upper portion being at least partially received within the lower portion so that the upper portion can telescopically collapse into the lower portion during a crash,
  a support bracket that in use is secured to a fixed part of the vehicle and includes two support bracket arms that depend from a base portion to embrace the shroud,
  a clamp rail that is releasably secured to the upper shroud portion, the clamp rail including a slot that extends generally horizontally,
  a clamp pin that extends through an opening in each of the arms of the bracket and through the generally horizontal slot in the rail, the clamp pin carrying a clamp mechanism that is movable between an undamped position in which the rail can move freely relative to the clamp pin and a clamped position in which the rail is fixed relative to the clamp pin, and characterized in that the rail is secured to the upper shroud portion by a deformable tab which protrudes from the upper shroud portion to hook onto a part of the rail that faces the steering wheel end of the shroud,
  and in that in use of the assembly with the cam mechanism in the clamped condition the tab is deformable under a predefined load applied to the upper shroud so as to unhook from the rail allowing the upper shroud to move axially relative to the rail and hence relative to the clam pin to permit collapse of the steering column shroud.

The tab may deform by bending under load. The tab may initially be bent and may straighten when a load is applied.

The tab may initially extend away from the upper shroud, and when it is deformed may be flattened onto the upper shroud to allow the upper shroud to pass under the rail.

The tab may be secured to the upper shroud by a rivet or weld. In an alternative the tab may be integral to the upper shroud and formed by a u-shaped slot in the shroud that defines a tongue that is bent out of the plane of the upper shroud prior to final assembly to form the tab.

A single tab may be provided, or more than one tab may be provided. Where there is a single tab this may be located vertically above and in the vertical plan containing inline with central axis of the shroud. The tab may extend upwards away from the upper shroud.

The opening in each of the arms of the support bracket may comprise a generally vertically extending slot and the clamp mechanism when in the unclamped position may permit the clamp pin to move freely along the slot to adjust the rake of the steering column shroud and prevent relative movement when clamped to lock the rake position.

By generally vertically extending slots and generally horizontally extending slots we do not mean that slots extend exactly vertical or horizontal, and the slots could be as much as 10 degrees or 20 degrees or more from vertical or horizontal. The skilled person will identify the horizontal slot as allowing rake adjustment (i.e. movement of the steering wheel with a vertical component) and the horizontal slot as allowing movement of the steering wheel for reach (i.e. with a horizontal component).

The assembly may further comprise an energy absorbing mechanism that is secured at a first part to the rail and at a second part to the upper shroud portion, the energy absorbing mechanism deforming when the upper shroud moves relative to the rail to at least partially control the rate of collapse of the steering assembly.

The energy absorbing mechanism may locate the rail in engagement with the tab prior to collapse. The first part of the energy absorbing mechanism may engage the rail at the end of the rail furthest from the steering wheel.

In use, with the cam mechanism in the unclamped condition the upper shroud and the energy absorbing mechanism can move together with the rail as the shroud is adjusted for reach. Both the rail and upper shroud move as one relative to the lower shroud. The rail is located at one end by the deformable tab and as the other by the energy absorbing mechanism, and the horizontal slots allow reach adjustment to be made. When clamped, the relative position of the ends of the energy absorbing mechanism and the rail are the same regardless of the rake and reach position. The deformation of the energy absorbing mechanism for a given axial movement of the upper shroud portion relative to the lower shroud portion will therefore always remain the same, giving consistent crash performance.

During a collapse that causes movement of the upper shroud relative to the lower shroud the energy absorbing mechanism provides the control of the collapse force.

To control the collapsed the energy absorbing mechanism may comprise at least one deformable energy absorbing strip having first and second ends, the first end fixed to the rail at the first part and the second to the upper shroud at the second part.

The energy absorbing mechanism may comprise two energy absorbing strips arranged side by side, each offset to a different side of the vertical centre line of the shaft. These may be configured as described above.

The or each strip may be wound into a coil before collapse and unwound during a collapse, the deformation during unwinding absorbing energy. Apart from being restrained at each end, the straps may otherwise not be restrained.

The end of the or each strip secured to the rail may be bolted to a plate that is welded to the rail. The other end may be hooked onto the end of the upper shroud.

The energy absorbing mechanism may be configured to provide two different levels of energy absorption during a collapse of the upper shroud portion when the clamp mechanism in clamped, a second level being lower than the first level.

The steering assembly may include selection means for selecting which of the two levels to apply during a collapse. This may determine which to apply prior to the crash using information from one or more sensors fitted to the vehicle such as a seat belt sensor that determines if the driver is wearing a seatbelt, a weight sensor that determines the weight of the driver, a vehicle speed sensor that determines the speed of the vehicle and so on.

The selection means may comprise a processor.

The energy absorbing mechanism may comprise an additional energy absorbing strap that has a first part that is fixed relative to the rail when in the first mode but not in the second, and a second part that is secured to the upper shroud, the additional energy absorbing device deforming when in the first mode and not when in the second mode to absorb some of the energy in the collapse of the shroud.

The energy absorption mechanism may include a latch that in the first mode of operation is located in a first position where it engages the first part of the additional energy absorbing mechanism and in the second mode of operation moves to a second position in which it does not restrain the first part.

The latch may be connected to a pyrotechnic device that when operated permits the latch to move from the first position to the second position. The device may be operated by the selection means.

The assembly may therefore include three straps. The central one of these can be rapidly de-selected via a Pyrotechnic Device under control from the selection means, as determined by driver weight, vehicle speed, non-wearing of seat-belts, etc. The use of 3 EAS's is for symmetry so that their combined resistance force is fairly central in either setting.

The latch may include a hole within which a pin of the pyrotechnic device is located, the pin preventing movement of the latch, the pin moving clear of the hole when the pyrotechnic device has been operated by the selection means selecting the second mode of operation where reduced energy absorption is needed. For instance if a driver is wearing a seatbelt and the vehicle is travelling slowly it would be expected that less force is applied to the upper shroud that needs to be absorbed.

The latch may comprise a bar that includes a guide slot that receives a guide block, the guide block being fixed relative to the rail and the guide slot extending at an acute angle to the direction of movement of the rail relative to the upper shroud, the block guiding the latch in the second mode s to move clear of the first part of the additional energy absorbing device. In guiding it may allow the bar to move away from the upper shroud so that additional energy straps can pass freely between the upper shroud and bar.

The guide block may be supported by a guide plate, to which the first ends of the fixed energy absorbing straps are secured. The guide plate may embrace the sides of the bar to work with the block to control the movement of the latch. The guide plate may also provide a secure mount from the pyrotechnic device.

The straps and guide plate may be located at the ends of the rail that is furthest from the steering wheel.

The clamp pin may be provided with a head at each end and the clamp mechanism carried by the clamp pin may comprise a cam mechanism that is located on the clamp pin and comprises a fixed cam and a moving cam, the cam mechanism being arranged to increase in length when moving from an unclamped position to a clamped position.

The heads may be fixed or adjustable axially along the clamp pin. For instance, one or both heads may comprise a nut that is threaded onto a thread on the end of the clamp pin.

The cam mechanism may be located between the outer face of one arm and one of the heads of the pin.

The clamp mechanism may further comprise a toothed rake block between the cam mechanism and the one of the arms that In addition to moving the reach and/or rake block into engagement with teeth on the upper shroud and support bracket, the cam mechanism when in the clamped position may apply a tensile force to the clamp bolt that squeezes the arms of the support arm bracket together and reduces that force when unclamped to allow the arms to move away from each other, the arms in turn squeezing the outer shroud onto the inner shroud.

When clamped the rail is squeezed onto the support arm. To ensure the rail cannot possibly move relative to the clamp bolt when clamped by any significant amount, a first rack of teeth may be provided that extend alongside the horizontal slot of the rail and the clamp bolt may carry a reach adjustment block that has a complimentary rack of teeth, a spring being provided that biases the teeth apart from the cam mechanism is unclamped and which is overcome as the cam mechanism is clamped so that teeth of the block engage the teeth of the rail. This provides a positive location of the rail.

The rack of teeth may be provided on a plate that is welded to the rail. The rail itself may comprise a metal casting that forms part of cast upper shroud, or may be a separate metal component welded or otherwise secured to the upper shroud.

Similarly, to prevent unwanted rake movement during a crash a second rack of teeth may be provided that extend alongside the vertical slot in one of the support arms and the clamp bolt may carry a rake adjustment block that has a complimentary rack of teeth, the same spring biasing the teeth apart from the cam mechanism is unclamped and which is overcome as the cam mechanism is clamped. This provides a positive location of the rail for rake. A separate spring could be provided to bias them apart.

The two blocks of teeth and the earn mechanism may all the threaded onto the clamp bolt between one arm and the associated fixed head of the bolt to provide a single stack of components, operation of the cam varying the overall length of this stack. In a modification the cam could be at one end of the bolt and the toothed blocks at the other. The same length stack would be present, but it would then consist of two sub-stacks, one outside of each arm.

As described the clamp mechanism will have both a clamped and unclamped position, and in the clamped position may squeeze the lower outer shroud portion onto the upper inner shroud portion. To provide further control of the collapse force, where positive toothed locking is provided, the clamp mechanism may be arranged to additionally provide a secondary clamped position in which the squeezing force applied by the arms onto the lower shroud portion is reduced or removed completely whilst the positive locking teeth remain in engagement. In this secondary clamped position the overall length of the stack must be less than for the first clamped position but greater than the unclamped position.

The amount of relax of the clamp mechanism between the fully clamped and secondary clamped positions may be chosen to be less than the height of the teeth, perhaps around 1 mm-2 mm.

The clamp mechanism may be arranged to move to this secondary clamped position automatically without any rotation of the moving cam of the cam mechanism upon the application of a sufficient force to the upper shroud portion in a direction of collapse of the steering assembly. When in this secondary clamped position any locking lever operated by the driver will remain in the clamped position.

To achieve the two clamped conditions, at least one of the interfaces between a first component in a stack of components located along the clamp pin selected from a list comprising the cam assembly, the one of the arms of the support bracket and the toothed blocks may include a raised portion and a radially offset lowered portion, and an second adjacent component on which the first component bears includes a face that engages the raised portion but not the lowered portion when in the fully clamped, whereby the raised portion is arranged to "step off" the corresponding face of the adjacent component when a load is radial load is applied to the cam bolt that exceeds a threshold level so that the lowered portion then contacts the face of the second adjacent component, thereby reducing the length of the stack of components.

By the term "step off" we mean that component with step moves radially relative to the adjacent component so that the face of the adjacent component moves to contact the lowered portion. By raised we mean that the raised portion is closer to the support arm than then lowered portion where the faces are facing the support arm. If the stepped faces are facing away from the support arm, the term raised is intended to mean that portion is further from the support arm than the lowered portion. In each case, the component has a greater axial length, measured along the axis of the clamp pin, in a section passing through the raised portion compared with a section passing through the lowered portion.

In one advantageous arrangement the clamp bolt may be arranged to cause a relative radial movement between the first component and the adjacent second component that causes them to step off each other when a predefined radial load is applied to the clamp bolt.

The clamp bolt may be prevented from moving in a direction parallel to the axis of the shroud when the load is below the predefined level by a locating member that is in turn restrained from moving relative to the support bracket by a frangible connector that connects the locating member to the support bracket, whereby in use of the steering assembly when the clamp mechanism is in the clamped condition and a load is applied to the upper column in an axial direction that exceeds the predefined threshold level, the connector will shear where after the clamp bolt will move radially in turn causing relative movement between at least one of the fixed cam, the moving cam and the rake block that reduces the tension in the clamp bolt and thereby at least partially releases the grip of the outer tube on the inner tube whilst maintaining the interlock of the two racks of teeth.

The apparatus may include a pair of stepped surfaces at the interface of one or more of the following pairs of the stacked components:

Between the fixed cam and the moving cam,
Between the rake block (where provided) and the reach block (where provided),
Between the rake block or the reach block and the support bracket arm.

The pairs of stepped surfaces may most preferably be located at the interface of the Fixed Cam and the Rake Tooth block, both of these components being in the compression load path of the cams.

The clamp bolt may have a square-section at a portion along its length that passes through an opening horizontal slot of an Anti-Rotation Plate secured to the support bracket, the size of the slot preventing rotation of the bolt.

The plate may be being located at a position between the arms of the support bracket. The plate may provide a pivot point that resists movement of that part of the cam bolt in the direction of the axis of the shroud as the upper shroud collapses.

The fixed cam portion may also include a square hole that engages with the square section of the bolt. The use of the square bolt and holes prevents the bolt rotating.

Because the cam bolt is prevented from rotation by the square section of the Clamp Bolt, the Support Bracket arm only has to constrain it from translation in the fore-and-aft direction. On the side of the Fixed Cam nearest to the steering wheel, this may be achieved via contact with an inner vertical face of the slot in the Rake Tooth Plate. On the other side of the Fixed Cam base, it may be constrained fore-and-aft via contact with a plastic Guide Block which is fusibly fixed to the Rake Bracket side arm.

In order to squeeze the arms of the Bracket inwards, the Fixed Cam has to "bridge" the span between the vertical sides of the vertical slot in the Tooth block. The Cam may designed as a two-piece assembly in which the actual cam profile is made as a sintered metal insert and is then pressed into a non-sintered metal base which has better bending strength.

A horizontal rectangular aperture in the Guide Block may be provided that fits around a shorter rectangular boss on the side arm, allowing some fore-aft travel.

2. Adaptive Crash Scheme.

According to a second aspect the invention provides a collapsible steering column assembly comprising a steering shaft that is supported within a steering column shroud by at least one bearing assembly, the shroud comprising an upper shroud portion and a lower shroud portion, in which the upper shroud portion is located towards the end of the steering shaft that is nearest the steering wheel and the lower portion is located towards the end of the shaft furthest from the steering wheel, the upper portion being at least partially received within the lower portion so that the upper portion can telescopically collapse into the lower portion during a crash, a support bracket that in use is secured to a fixed part of the vehicle and includes at least one arm that depends from a base portion alongside the shroud in the region where the lower shroud portion overlaps the upper shroud portion and a clamp mechanism that in a clamped condition secures a rail that is secured to the upper shroud to the bracket so as to prevent movement of the upper shroud relative to the bracket and in a clamped mechanism permits movement of the shroud relative to the bracket, and further in which the rail is secured to the upper shroud by an energy absorbing mechanism that acts between the rail and the upper shroud portion that is configurable to provide at least two different levels of energy absorption during a collapse of the steering column in which the upper shroud portion moves relative to the clamp rail.

The assembly may switch between the two configurations in response to a signal from an energy absorbing level selection means.

The provision of a two level energy absorbing device between the rail and the upper shroud allows the amount of force resisting collapse to be controlled simply by selecting the appropriate energy absorption level.

The energy absorption mechanism may include a latch that in the first mode of operation engages a portion of the additional energy absorbing mechanism and a second mode in which it moves clear of that portion.

The latch may be connected to a pyrotechnic device that when operated moves the latch from the first mode to the second mode.

The latch and energy absorbing member may be fixed to the upper shroud portion by a mounting bracket.

3. Clamp Bolt De-Tensioner.

According to a third aspect the invention provides a collapsible steering column assembly comprising a steering shaft that is supported within a steering column shroud by at least one bearing assembly, the shroud comprising an upper shroud portion and a lower shroud portion, in which the upper shroud portion is located towards the end of the steering shaft that is nearest the steering wheel and the lower portion is located towards the end of the shaft furthest from the steering wheel, the upper portion being at least partially received within the lower portion so that the upper portion can telescopically collapse into the lower portion during a crash, a support bracket that in use is secured to a fixed part of the vehicle and includes at least two arms, each of which depends from a base portion alongside a respective side of the shroud in the region where the lower shroud portion overlaps the upper shroud portion, and a clamp mechanism that comprises a stack of components that are located along a clamp bolt, the clamp bolt passing through an opening in each arm of the bracket, the stack of components including a cam assembly that is rotatable between an undamped position in which it has a first axial length and a second clamped position in which it has a second, greater, axial length, the support bracket arm being pressed onto the shroud when the clamp mechanism is in the clamped position thereby to squeeze the lower shroud onto the upper shroud, characterised in that the clamp mechanism is arranged to additionally provide a secondary clamped position in which the squeezing force applied by the support bracket onto the lower shroud portion is reduced or removed completely without any corresponding rotational movement of the cam mechanism.

Providing the secondary clamped position reduces or removes the friction between the lower shroud and upper shroud and is an aid to reducing the variability of the Crash-Force versus Travel characteristic and also a means of improving the ability of the column to ride-down when the direction of the impacting force is heavily offset from the column axis (e.g. by >30 degrees).

The stack of components may include a toothed rake block carried by the clamp pin, the toothed block carrying a first rack of teeth that in both the clamped and secondary clamped position engage corresponding teeth that are fixed relative to the support bracket thereby to prevent movement of the shroud for rake, the toothed block being held apart from the teeth secured to the support bracket when in the unclamped position.

The stack of components may include a toothed reach block carried by the clamp pin, the toothed reach block carrying a second rack of teeth that in both the clamped and secondary clamped position engage corresponding teeth that are fixed relative to the rail thereby to prevent movement of the shroud for reach, the toothed block being held apart from the teeth secured to the rail when in the unclamped position.

The clamp bolt may include a head at each end, the stack of components being located between one head and a one of the support arms.

The friction-removal mechanism of this third aspect of the invention reduces the tension in the Clamp Bolt, under a crash impact, by reducing the stack height of a part of the clamp assembly that is under load when clamped by a small amount, perhaps only 1 mm-2 mm reduction.

To achieve the two clamped conditions, at least one of the interfaces between a first component in a stack of components located along the clamp pin selected from a list comprising the cam assembly, the one of the arms of the support bracket and the toothed blocks may include a raised portion and a radially offset lowered portion, and an second adjacent component on which the first component bears includes a face that engages the raised portion but not the lowered portion when in the fully clamped, whereby the raised portion is arranged to "step off" the corresponding face of the adjacent component when a load is radial load is applied to the cam bolt that exceeds a threshold level so that the lowered portion then contacts the face of the second adjacent component, thereby reducing the length of the stack of components.

By the term "step off" we mean that component with step moves radially relative to the adjacent component so that the face of the adjacent component moves to contact the lowered portion. By raised we mean that the raised portion is closer to the support arm than then lowered portion where the faces are facing the support arm. If the stepped faces are facing away from the support arm, the term raised is intended to mean that portion is further from the support arm than the lowered portion. In each case, the component has a greater axial length, measured along the axis of the clamp pin, in a section passing through the raised portion compared with a section passing through the lowered portion.

In one advantageous arrangement the clamp bolt may be arranged to cause a relative radial movement between the first component and the adjacent second component that causes them to step off each other when a predefined radial load is applied to the clamp bolt.

The clamp bolt may be prevented from moving in a direction parallel to the axis of the shroud when the load is below the predefined level by a locating member that is in turn restrained from moving relative to the support bracket by a frangible connector that connects the locating member to the support bracket, whereby in use of the steering assembly when the clamp mechanism is in the clamped condition and a load is applied to the upper column in an axial direction that exceeds the predefined threshold level, the connector will shear where after the clamp bolt will move radially in turn causing relative movement between at least one of the fixed cam, the moving cam and the rake block that reduces the tension in the clamp bolt and thereby at least partially releases the grip of the outer tube on the inner tube whilst maintaining the interlock of the two racks of teeth.

The apparatus may include a pair of stepped surfaces at the interface of one or more of the following pairs of the stacked components:

Between the fixed cam and the moving cam,
Between the rake block (where provided) and the reach block (where provided),
Between the rake block or the reach block and the support bracket arm.

The pairs of stepped surfaces may most preferably be located at the interface of the Fixed Cam and the Rake Tooth block, both of these components being in the compression load path of the cams.

The clamp bolt may have a square-section at a portion along its length that passes through an opening horizontal slot of an Anti-Rotation Plate secured to the support bracket, the size of the slot preventing rotation of the bolt.

The plate may be being located at a position between the arms of the support bracket. The plate may provide a pivot point that resists movement of that part of the cam bolt in the direction of the axis of the shroud as the upper shroud collapses.

The fixed cam portion may also include a square hole that engages with the square section of the bolt. The use of the square bolt and holes prevents the bolt rotating.

Because the cam bolt is prevented from rotation by the square section of the Clamp Bolt, the Support Bracket arm only has to constrain it from translation in the fore-and-aft direction. On the side of the Fixed Cam nearest to the steering wheel, this may be achieved via contact with an inner vertical face of the slot in the Rake Tooth Plate. On the other side of the Fixed Cam base, it may be constrained fore-and-aft via contact with a plastic Guide Block which is fusible fixed to the Rake Bracket side arm.

In order to squeeze the arms of the Bracket inwards, the Fixed Cam has to "bridge" the span between the vertical sides of the vertical slot in the Tooth block. The Cam may designed as a two-piece assembly in which the actual cam profile is made as a sintered metal insert and is then pressed into a non-sintered metal base which has better bending strength.

A horizontal rectangular aperture in the Guide Block may be provided that fits around a shorter rectangular boss on the side arm, allowing some fore-aft travel.

Other advantages of this invention will become apparent to those skilled in the art from the following detailed description of the preferred embodiments, when read in light of the accompanying drawings.

DETAILED DESCRIPTION OF THE INVENTION

Figure 2:
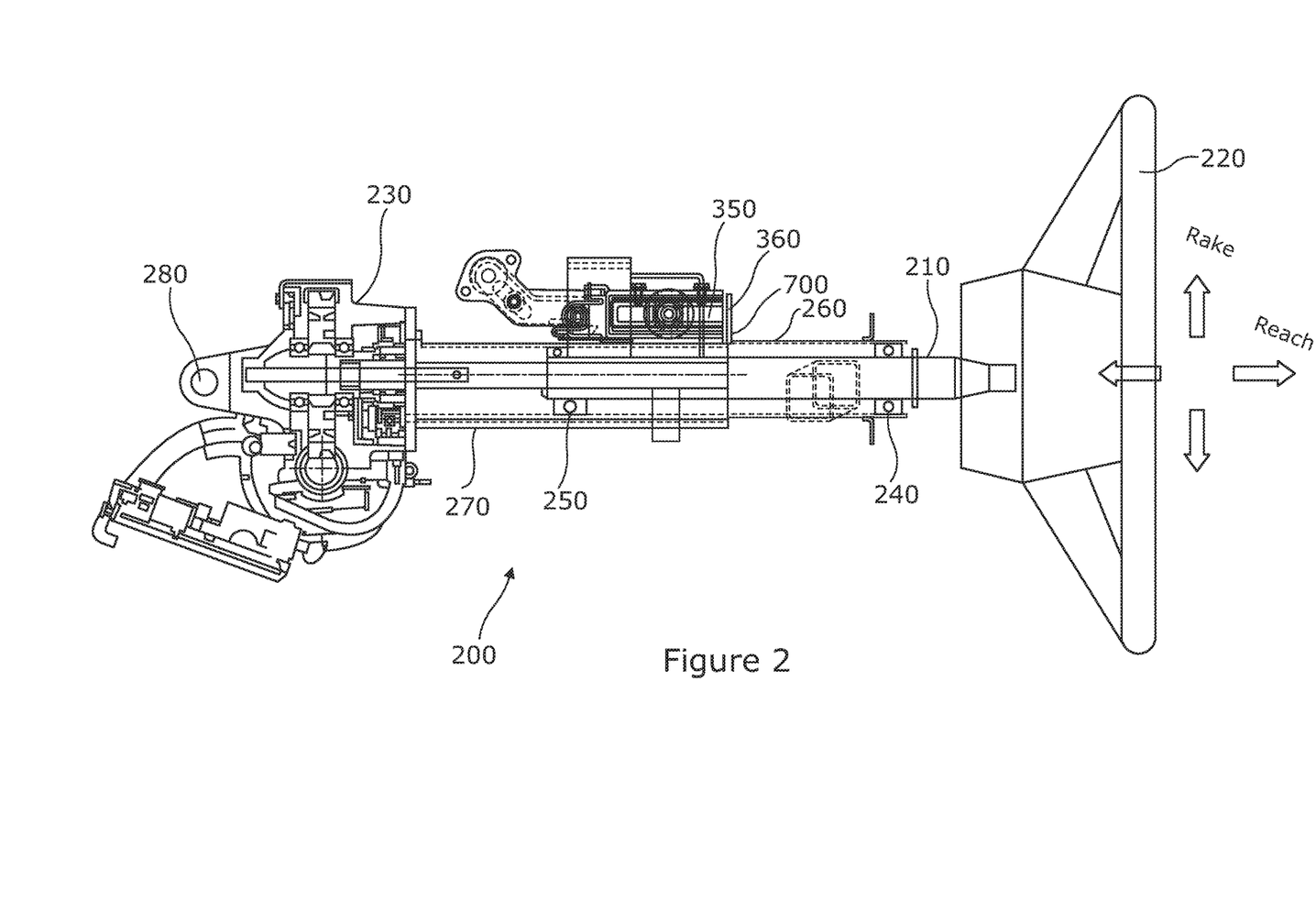
FIG. 2 is a corresponding view of an embodiment of a steering column assembly in accordance with an aspect of the invention.

As shown in FIG. 2, a collapsible steering column assembly 200 in accordance with at least one aspect of the present invention comprises a telescopic steering shaft 210 that supports a steering wheel 220 and connects the steering wheel to a gearbox 230. The steering shaft is supported within a telescopic steering column shroud by two bearing assemblies 240, 250, one bearing assembly 240 near the steering wheel 220 and the other bearing assembly 250 lower down the shroud, and is free to rotate around its axis to allow the steering wheel to be turned.

The shroud comprises an upper shroud portion 260 and a lower shroud portion 270. Each portion is tubular comprising a hollow elongate tube. The upper shroud portion 260 is located towards the end of the steering shaft that is nearest the steering wheel 220 and the lower portion 260 is located towards the end of the shaft furthest from the steering wheel 220. The end of the upper portion furthest from the steering wheel is a sliding fit within the end of the lower portion that is nearest the steering wheel 1a so that the upper portion can telescopically collapse into the lower portion during a crash. As shown approximately half of the upper tubular portion fits into the lower tubular portion.

The shroud 260,270 is fixed to the vehicle body. As shown it is fixed towards a lower end by the gearbox at a pivot point 280. About half way along the shroud it is releasably fixed to a support bracket 300 that in use is secured to a fixed part of the vehicle (not shown). The support bracket 300 is omitted from FIG. 2 for clarity and can be seen best in FIGS. 5A and 5B and FIGS. 7, 8 and includes two arms 310,320 that depend from a base portion 330 alongside respective sides of the shroud in the region where the lower shroud portion overlaps the upper shroud portion. Each arm 310, 320 in this embodiment includes an opening, in this example an elongate generally vertical slot 315,325 through which a clamp pin or bolt 340 passes. This clamp pin 340 also passes through an elongate generally horizontal slot 350 in a rail 360 that is secured to the top of the upper shroud. This rail can best be seen in FIGS. 3 and 4 of the drawings. The rail extends through a slot in the top of the lower shroud so that it extends above the lower shroud between the arms of the support bracket 300. The clamp pin 340 carries a clamp mechanism arranged so that when undamped the clamp pin 340 can move up and down the vertical slots 315,325 and along the horizontal slot 350 in the rail 360 to allow the shroud to be adjusted for both rake and reach. When clamped, the upper shroud is fixed relative to the bracket to "lock in" the rake and reach position.

Figure 5A:
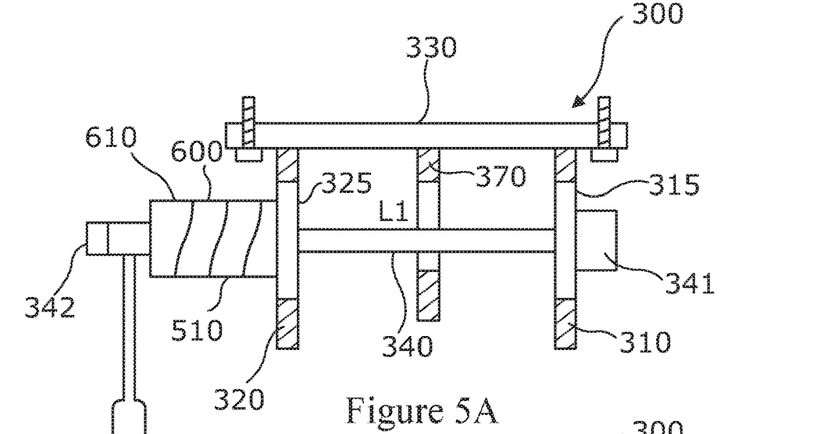
FIGS. 5A and 5B show the clamp mechanism of the assembly of FIGS. 2 to 4.
Figure 5B:
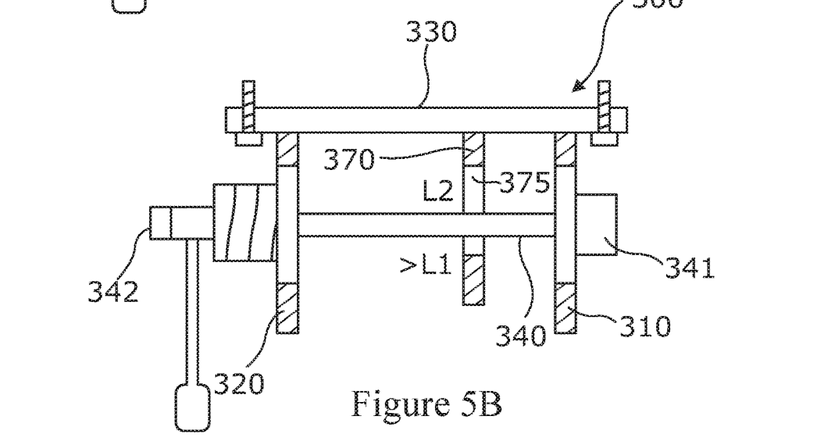
Figure 7:
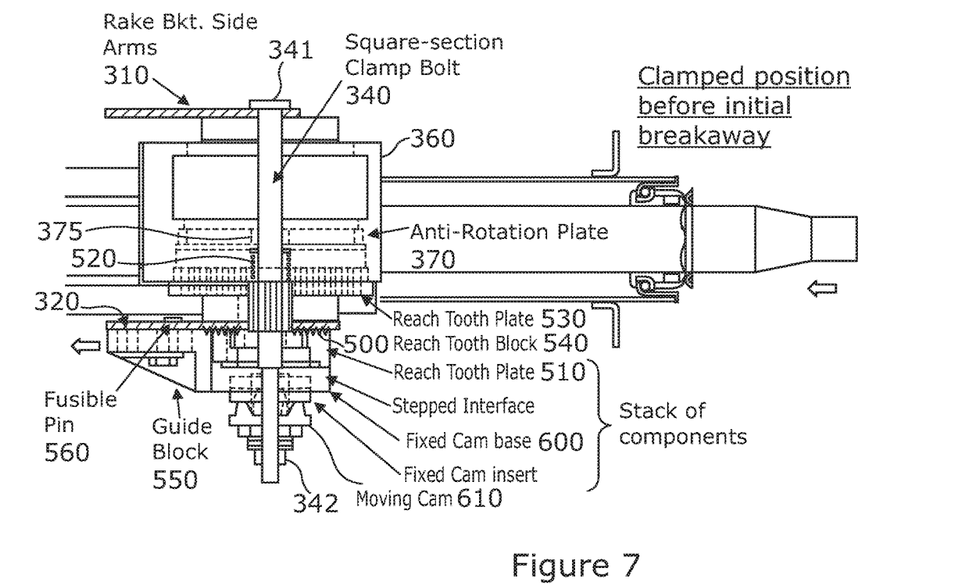
FIG. 7 is a cross sectional view in more detail from above of the assembly of FIG. 2 prior to a collapse.

As shown in FIGS. 5A, 5B and 7, the clamp pin 340 has a square cross section and passes through a vertical slot 375 in an anti-rotation plate 370 that depends from the support bracket base 330 about midway between the arms 310,320. The width of the clamp pin 340 and of the slot 375 are chosen such that the clamp pin 340 is prevented from rotating by the slot in the anti-rotation plate.

The shroud 260,270 is locked in place by reducing the length of the portion of the clamp bolt 340 that is located between the support bracket arms 310,320 by operation of a clamp mechanism. In this embodiment the clamp pin has a head 341,342 that is provided at each end of the clamp bolt. A stack of components (indicated in FIG. 7 by the curved bracket) is located along the clamp bolt 340 between one of the arms 320 and the adjacent head 342 and the overall length of this stack is varied as the clamp mechanism moves between clamped and unclamped positions. The change in length varies the length of clamp pin 340 that sticks out from the one of the support arms 320, in turn varying the length of clamp pin 340 that can extend between the support bracket arms. FIGS. 5A and 5B show the change from length L1 of pin between the arms when clamped to length L2 when unclamped.

To provide a positive lock when clamped, one arm 320 is provided with a rack of teeth 500 that extend alongside the vertical slot and the stack of components includes a toothed block or plate 510 that is located between the arm and the head 342 of the clamp pin 340. The block or plate carries a second rack of complimentary teeth that face the first rack 500. A spring 520 urges the block 510 away from the arm 320 when the clamp mechanism is unclamped and is compressed when clamped so that the teeth of the two racks interlock.

A second rack of teeth 530 is provided on a plate that is secured to the clamp rail 360 alongside the horizontal slot 350 and the stack of components includes a second toothed block or plate 540 is located on the clamp pin 340 that is secured to the upper shroud portion and which extends through a slot in the lower shroud portion. This second block is also urged away from the teeth by the spring 520 when the assembly is unclamped.

To produce the required clamping the stack includes a cam mechanism that is threaded onto the clamp pin 340 between the rake block 510 and the fixed head 342. The cam mechanism comprises a fixed cam 600 and a moving cam 610. The moving cam is secured to a lever (shown in FIGS. 5A and 5B) that allows a user to rotate the moving cam around the cam bolt. The fixed cam does not rotate because the fixed cam has a square hole and threads onto a square section of the clamp pin 340 so that the fixed cam cannot rotate. The moving cam has a larger sized circular hole so it can rotate.

Figure 6A:
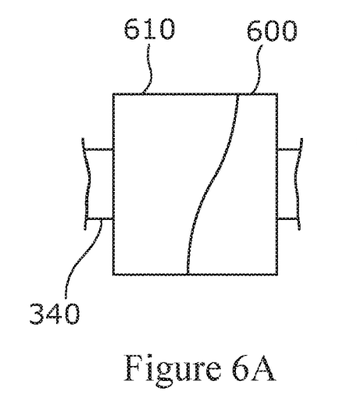
FIGS. 6A and 6B are views of the cam mechanism of the clamp assembly when in the undamped and the clamped positions.
Figure 6B:
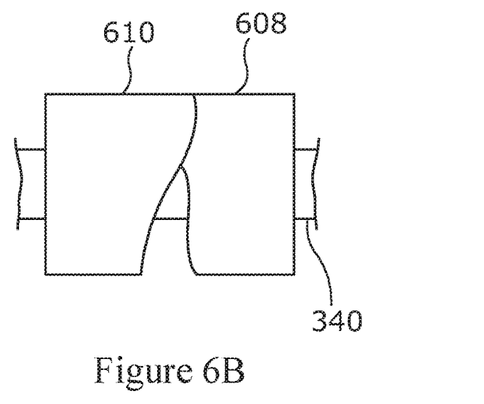

Rotation of the clamp lever varies the overall length of the cam mechanism between a minimum length in the undamped condition and a maximum length on a clamped condition. The length is measured along the axis of the clamp pin. This is shown in FIGS. 6A and 6B for the unclamped and clamped positions respectively.

The cam mechanism 600,610 when in its longest position pushes the head 342 of the pin 340 away from the support bracket. The other head 341 engages the other arm 310 of the support bracket and tries to oppose the movement of the head 342 away from the support bracket. The results is that the cam mechanism applies a force between the fixed head 342 and the arm 320 when clamped that presses the toothed blocks into engagement with the respective rake and reach teeth racks. This force also urges the two arms of the support bracket together, pressing the outer tube of the shroud onto the inner tube.

Figure 8:
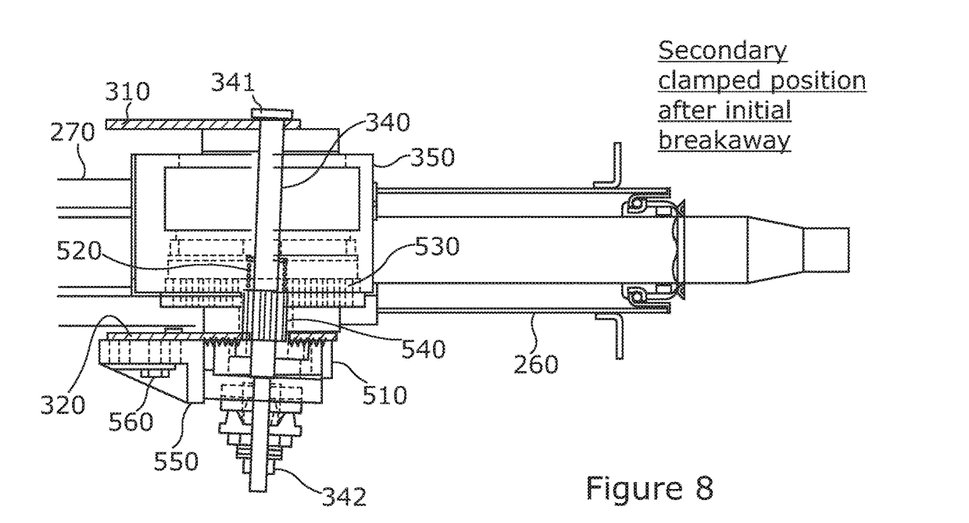
FIG. 8 is a view corresponding to FIG. 7 after a collapse.

As shown in FIGS. 7 and 8 there is a guide block 550 that locates the fixed cam relative to the support arm. The block 550 is normally secured to the support arm by a shear pin 560. The guide block prevents side to side movement of the fixed cam and hence prevents side to side movement of the clamp pin 340 (the vertical slot in the arm otherwise being slightly oversized to allow this movement. As will be explained, the shear pin 560 can shear under load to allow a small amount of radial movement of the clamp pin 340, pivoting around the slot in the anti-rotation plate 370. This movement causes a raised portion of the face of the fixed cam to "step off" a corresponding face of the rake tooth plate, and a raised portion of the tooth plate to step off a face of the fixed cam, thereby reducing the overall thickness of the fixed cam and raked tooth plate. When this happens, the amount of tension in the clamp bolt reduces but the teeth remain engaged. The reduction is sufficient to remove the squeezing force of the outer tube on the inner tube but not enough to introduce any excess free play.

FIG. 7 shows the steering column assembly in t fully clamped position before the pin 560 has sheared and FIG. 8 shows it after when the clamp mechanism is in a so called secondary clamped position after the pin has sheared. Note that in this position the teeth of the reach and rake racks remain engaged, but the length of clamp pin between the two support bracket arms has increased slightly, reducing the amount the two shrouds are squeezed together.

This arrangement of the clamp mechanism enables the tube-to-tube friction which is present due to the operation the clamping lever and cam mechanism to be removed at the onset of a crash.

Figure 3:
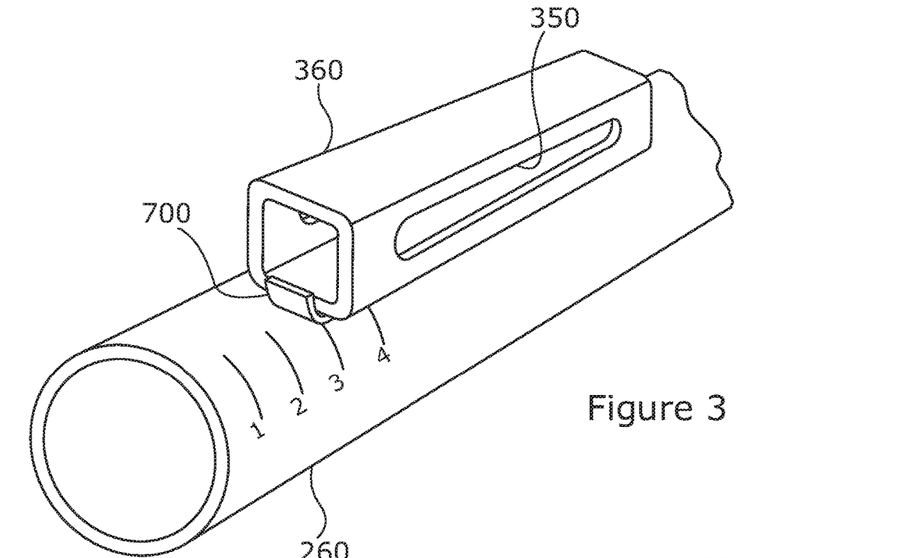
FIG. 3 is partial view of the assembly of FIG. 1 prior to collapse.
Figure 4:
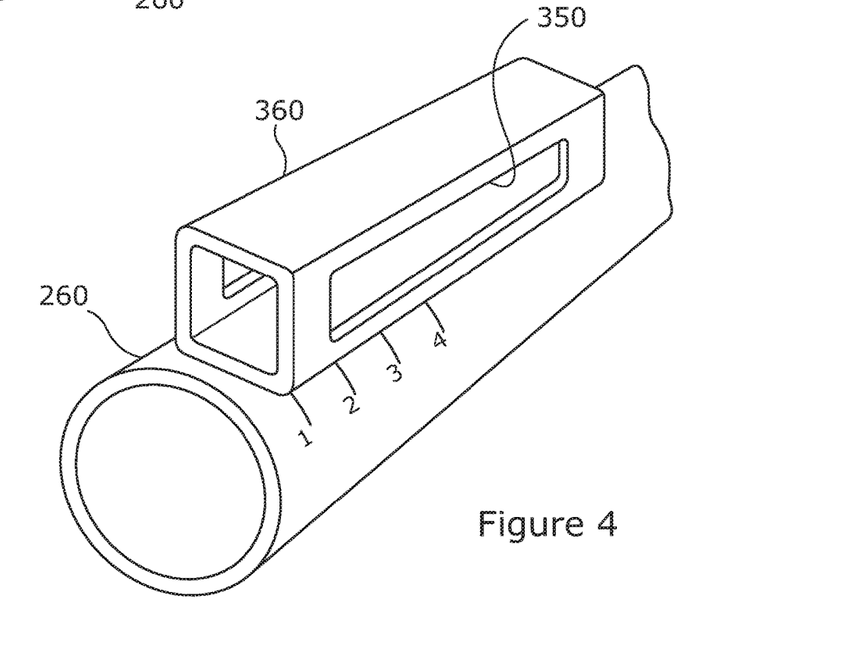
FIG. 4 is a view corresponding to FIG. 3 after a collapse.

Looking now at FIGS. 3 and 4 of the drawings, the clamp rail 360 is secured to the upper shroud 260 at an end nearest the steering wheel by a locating tab 700. The tab hooks around an end of the rail that faces the steering wheel 1a.

During normal use (shear pin 560 not broken, clamp mechanism either clamped or unclamped) the tab 700 ensures that the rail 360 does not move axially relative to the upper shroud 260 in a direction towards the steering wheel. The tab 700 may, when a force is applied to the upper shroud that exceeds a predefined level, deform to allow the upper shroud to move relative to the rail, passing under the rail. This allows the shroud to collapse while the rail remains clamped to the clamp bolt and hence fixed in position relative to the support bracket.

Specifically, movement of the rail flattens the hooked tab 700 down towards the main body of the upper shroud. This is seen in FIG. 4.

Figure 9:
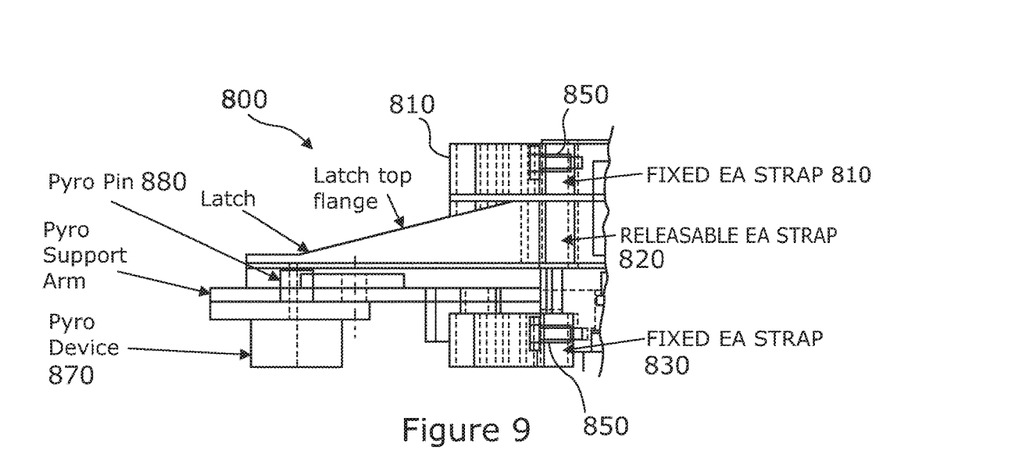
FIG. 9 is a view from above of a part of the energy absorbing mechanism of the steering column assembly of FIG. 2.

The clamp rail 360 is also fixed to the upper shroud at the end furthest from the steering wheel by an energy absorbing mechanism 800 as best shown in FIG. 9. This mechanism 800 controls the movement of the rail 360 relative to the shroud in the event that a high axial load is applied to the upper shroud that causes the steering column assembly to telescopically collapse. When the rail moves relative to the shroud, the energy absorbing mechanism deforms and this deformation absorbs the energy.

The energy absorbing mechanism can be seen best in FIGS. 9 to 15 of the accompanying drawings. FIG. 9 shows the assembly 800 in plan, whilst FIGS. 9 to 15 show the assembly during various stages of collapse of the steering column assembly. As will explained a significant feature of this part of the assembly is that the Energy Absorption mechanism provides the same force-vs-stroke profile regardless of the initial reach-adjustment position selected prior to a crash.

The energy absorbing mechanism comprises three coiled Energy Absorption Straps (EAS's) 810,820,830 arranged side by side. The axis of each strap is orthogonal to the axis of the shroud, the coils being generally arranged in a vertical plane. All three straps 810,820,830 are anchored at one end to a plate 840 that is fixed to the upper shroud 260. The other end of the outer two straps are secured to the rail 360 by bolts 850, and the other end of the middle strap is selectively secured to a latch mechanism 860 fixed to the rail depending on which of two different energy absorbing modes the assembly is in. On relative movement of the upper shroud and the clamp rail with the clamp mechanism in the secondary clamp position the outer two EAS's uncoil themselves, absorbing energy. The inner coil will also function in this way if it is secured to the latch, but if it is released from the latch it will not uncoil and will play no part in the absorbing of the crash energy.

Figure 10:
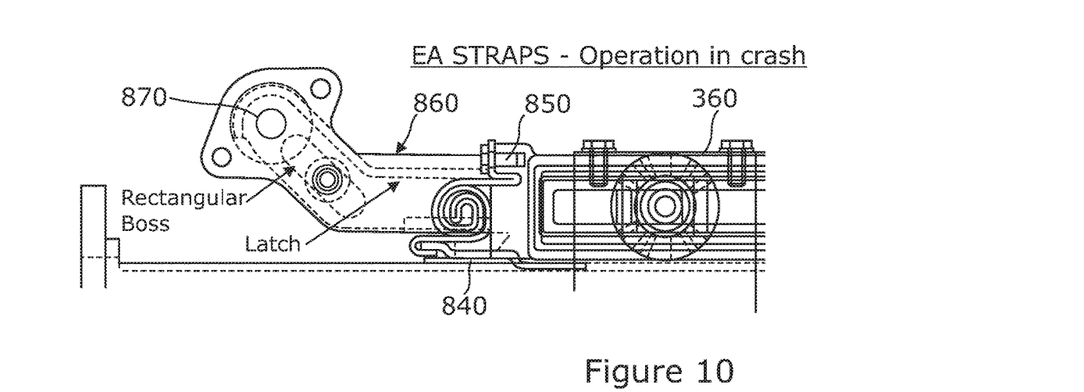
FIG. 10 is view of the energy absorbing assembly before a collapse.
Figure 11:
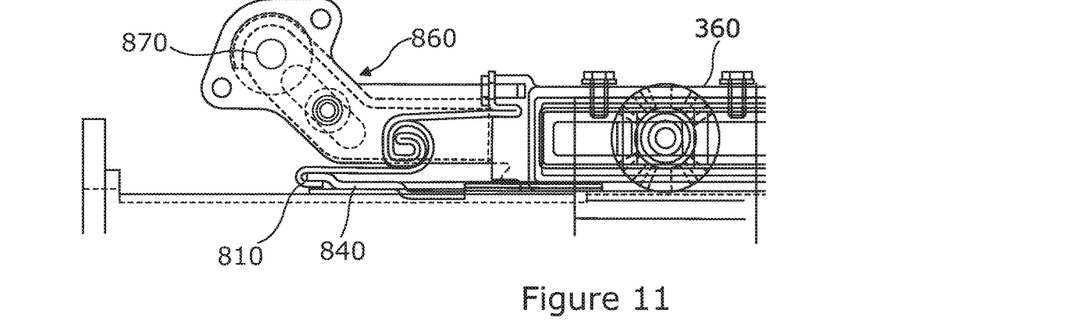
FIG. 11 is a view corresponding to FIG. 10 after a collapse.
Figures 12, 13:
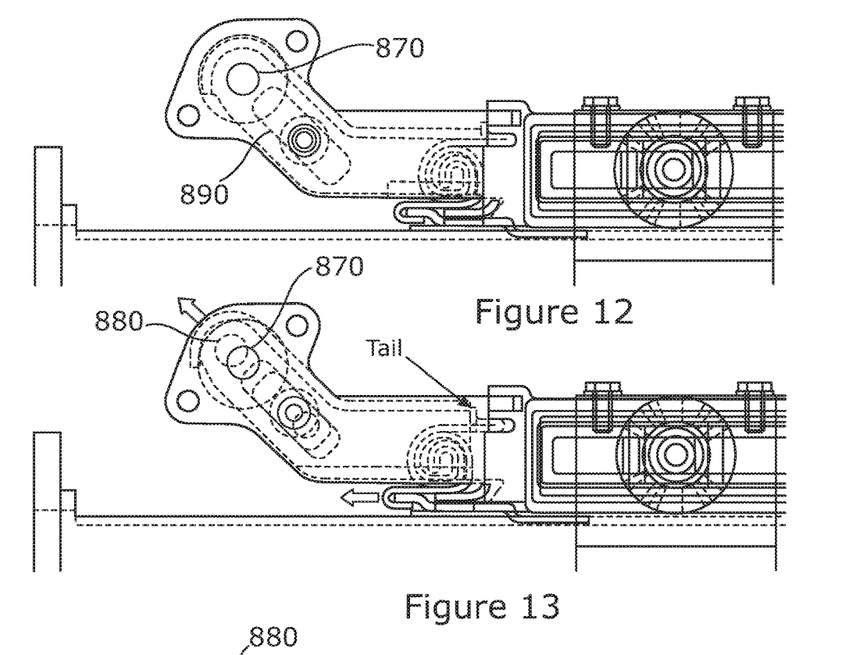
FIGS. 12 to 15 show the assembly moving from an uncollapsed to a collapsed condition in a state where the pyrotechnic latch is released to reduce the collapse force.
Figures 14, 15:
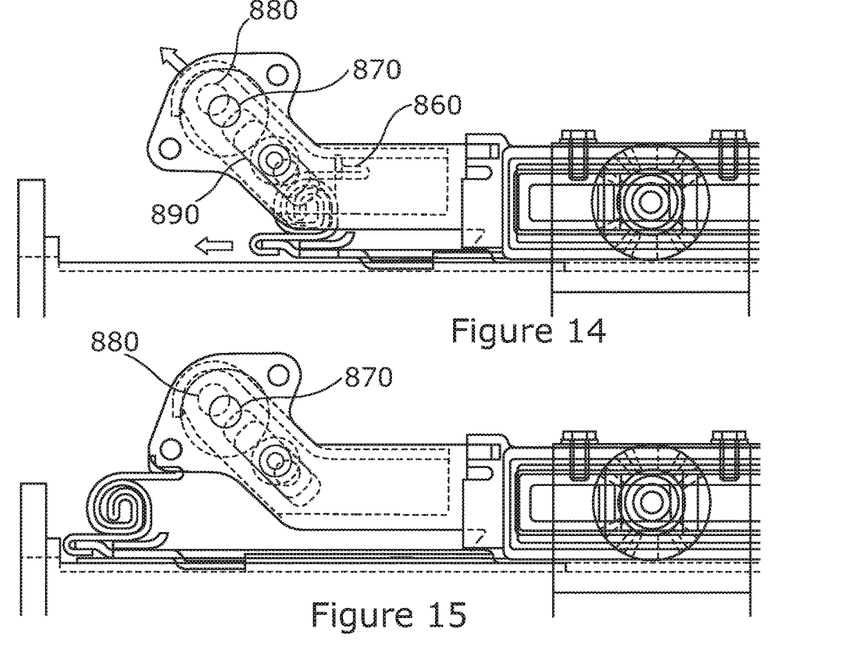

The latch 860 may be prevented from moving away from a position in which it engages the inner coiled strap 820 by a pyrotechnic device 870 secured to a bracket that is secured to the clamp rail. The pyrotechnic device 870 retracts a pin 880 which is normally located in a hole in the latch 860 to prevent the latch moving relative to the clamp rail 360. When locked in place by the pin 870, the end of the inner strap 820 is blocked from moving by the latch. FIG. 10 shows the inner coil before collapse and FIG. 11 shows the coil unwinding during relative movement of the upper shroud and rail.

As shown in FIGS. 9 to 15, the Latch 860 which is mounted to an angled rectangular boss 890 on one side of a support arm. This boss, being shorter than a corresponding aperture in the latch, guides the Latch 860 to slide upwards and forwards (see dotted arrows, right in FIG. 13), if urged, once the pin of the Pyro Device is withdrawn. This sliding action occurs due to the tail of the disengaged EAS pushing on the horizontal flange of the Latch. A point is quickly reached when the tail of the inner strap is able to continue forwards unimpaired beneath the flange of the raised Latch. This movement is shown in FIGS. 12 to 15.

The gyro device 870 withdraws the pin 880 in response to a signal from a controller, which may vary according to parameters such as the speed of the vehicle and whether or not the driver was wearing a seatbelt.

The operation of the steering assembly before and during a crash event will now be described.

When the driver wishes to adjust the steering for reach or rake, the clamp lever is rotated to cause the cam mechanism to move to it shortest length. The springs push the toothed racks apart, and the shroud can be adjusted freely. Once complete, the clamp lever is rotated to move the cam mechanism to its greatest length, compressing the springs and bring the toothed racks together. This also squeezes the lower shroud onto the upper shroud removing any free radial play between the shrouds.

During normal use, when zero axial load is applied to the upper shroud or a low load is applied, the movement of the shroud is prevented by the clamp mechanism. The force is earthed out to the support bracket through the frangible pin.

If a large axial force is applied to the upper shroud in a direction away from the steering wheel, as may happen in a crash if a driver is thrown onto the steering wheel, the upper shroud will move a little and this movement causes the pin to shear. This in turn allows further movement of the fixed cam relative to the moving cam, until it "steps off", releasing the clamp tension that creates friction between the outer shroud and the inner shroud. The clamp mechanism moves to the secondary clamped position where the lower shroud is no longer squeezed onto the upper shroud. This removes the effect of friction between the two shrouds as the upper shroud continues to move.

Once the pin has sheared the clamp bolt and rail will move axially approx. 4 mm. The clamp bolt remains in toothed engagement with the rail so the rail cannot move any further axially relative to the clamp pin, which now stops moving as it is blocked by the support bracket arms.

As the upper column continues to move, unopposed by the friction that was present between the upper column and outer column, the end of the fixed rail then deforms the tab as the upper tube continues to move down towards the gearbox. This deformation of the tab absorbs some of the crash energy.

Once this has been overcome, the upper tube will continue to move and will start to deform the energy absorbing straps.

In a normal, low energy, crash all three straps will deform absorbing energy. The middle strap is fixed to the upper tube and has a portion that hooks onto the latch which is itself fixed to the rail. The rail cannot move as it is fixed to the pin.

The outside straps are fixed to the rail and the upper column and also deform.

In a light crash, the latch is released and can slide out of the way allowing the middle strap to unhook from the latch and hence move as a whole with the upper column providing no energy absorption.

The shearing of the Guide Block pin represents the "Initial Breakaway" under crash impact and results in around 4 mm of forward movement of the steering wheel. The initial impact must overcome both the strength of the pin and also the tube-to-tube clamping friction. After the Initial Breakaway, the latter disappears and all of the impact force is concentrated on the fusible tab which secures to Clamp Bracket to the Inner Tube. If the tube-to-tube clamping friction is 1000 N, then for a specified overall Breakaway Force (e.g. 5000 N), the shear strength of the pin should be set at 4000 N and the strength of the tab should be 5000 N. Under a 5000 N impact, the tab will only see 4000 N before the pin fails since the tube friction will react the other 1000 N. Only after the Initial Breakaway will the tab see the full 5000 N and fail, resulting in the "Main breakaway." The correct sequence is thereby assured.

The straps, EAS's, are coiled around themselves and do not require to slide over anvils. Therefore there is no friction force component from the EAS's when they deform (i.e. straighten) in crash. The crash force is entirely due to strain energy being absorbed in the material.

If the central EAS is released from the latch, its compact coiled shape means that it remains within the package space throughout the crash stroke.

The Pyro device only ever has to move (axially) by the amount of the Reach Adjustment stroke. The EAS's can pass underneath it. The Pyro support arm is made as narrow as possible to ensure that the maximum width is available for the EAS's.

What is claimed is:

1. A collapsible steering column assembly comprising a steering shaft that is supported within a steering column shroud by at least one bearing assembly, the steering column shroud comprising an upper shroud portion and a lower shroud portion, in which the upper shroud portion is located towards an end of the steering shaft that is nearest a steering wheel and the lower shroud portion is located towards the end of the steering shaft furthest from the steering wheel, the upper shroud portion being at least partially received within the lower shroud portion so that the upper shroud portion can telescopically collapse into the lower shroud portion during a crash, a support bracket that in use is secured to a fixed part of a vehicle and includes at least one arm that depends from a base portion alongside the steering column shroud in a region where the lower shroud portion overlaps the upper shroud portion and a clamp mechanism that in a clamped condition secures a rail that is secured to the upper shroud portion to the bracket so as to prevent movement of the upper shroud portion relative to the bracket and in an unclamped condition permits movement of the upper shroud portion relative to the bracket, and further in which the rail is secured to the upper shroud portion by an energy absorbing mechanism that acts between the rail and the upper shroud portion that is configurable to provide at least two modes of operation each corresponding to a different level of energy absorption during a collapse of the steering column in which the upper shroud portion moves relative to the rail.

2. The collapsible steering column assembly according to claim 1 configured to switch between a first mode of operation and a second mode of operation in response to a signal from an energy absorbing level selection means.

3. The collapsible steering column assembly according to claim 2 further comprising a latch that in the first mode of operation engages a portion of an additional energy absorbing mechanism and in the second mode of operation moves clear of the portion.

4. The collapsible steering column assembly according to claim 3 in which the latch is connected to a pyrotechnic device that when operated moves the latch from the first mode of operation to the second mode of operation.

5. The collapsible steering column assembly according to claim 3, in which the latch and additional energy absorbing mechanism are fixed to the upper shroud portion by a mounting bracket.

* * * * *